United States Patent Office 3,796,712
Patented Mar. 12, 1974

3,796,712
N-CHLOROTHIOAMINO TRIAZINES
James D. Cleveland, Albany, Calif., assignor to Chevron Research Company, San Francisco, Calif.
No Drawing. Filed May 8, 1972, Ser. No. 251,088
Int. Cl. C07d 55/20
U.S. Cl. 260—249.8        9 Claims

ABSTRACT OF THE DISCLOSURE

N-chlorothioamino triazines are produced by the reaction of sulfur dichloride and a triazine containing an amino substituent having at least one hydrogen substituted on the amino nitrogen atom in the presence of a rate determining amount of an acid acceptor. The N-chlorothioamino triazines are useful intermediates in the preparation of pesticides.

FIELD OF THE INVENTION

This invention relates to a process for producing sulfenyl chloride (N-chlorothioamino) derivatives of amino-substituted triazines wherein the amino substituent has at least one hydrogen atom.

Processes for producing sulfenyl chloride derivatives of compounds having active hydrogen atoms substituted on nitrogen are known. E. Kuhle, Synthesis, 561 (1970), discloses the preparation of sulfenyl halide derivatives of sulfoamides and amines. U.S. Ser. No. 45,902 of G. K. Kohn, filed June 12, 1970, now U.S. Pat. No. 3,699,122 discloses the preparation of sulfenyl halide derivative of amides. U.S. Ser. Nos. 88,105, now U.S. Pat. No. 3,679,-733, and 88,212 of M. S. Brown and G. K. Kohn, filed Nov. 9, 1970, disclose the preparation of sulfenyl halide derivatives of urea and carbamate compounds.

DESCRIPTION OF THE INVENTION

Compounds of the present invention may be represented by the Formula I:

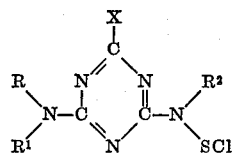

wherein X is halogen of atomic number 9 to 35 (fluorine, chlorine or bromine), alkylthio of 1 to 4 carbon atoms or alkoxy of 1 to 4 carbon atoms; R is hydrogen or alkyl of 1 to 4 carbon atoms; and $R^1$ and $R^2$ individually are alkyl of 1 to 4 carbon atoms.

Representative alkylthio groups which X may represent include methylthio, ethylthio, isopropylthio, n-propylthio, and n-butylthio.

Representative alkoxy groups which X may represent include methoxy, ethoxy, propoxy, isopropoxy and n-butoxy.

Representative alkyl groups which R, $R^1$ and $R^2$ may represent include methyl, ethyl, n-propyl, isopropyl, n-butyl and t-butyl.

Preferably X is chlorine, methylthio, or methoxy; R is hydrogen; $R^1$ is ethyl or isopropyl; and $R^2$ is ethyl or isopropyl. More preferably $R^1$ and $R^2$ are the same.

Representative compounds of the present invention include 2-(N-chlorothio-N-methylamino)-4-methylamino-6-chloro-1,3,5-triazine,
2-(N-chlorothio-N-methylamino)-4-ethylamino-6-fluoro-1,3,5-triazine,
2-(N-chlorothio-N-ethylamino)-4-ethylamino-6-chloro-1,3,5-triazine,
2-(N-chlorothio-N-butylamino)-4-propylamino-6-bromo-1,3,5-triazine,
2-(N-chlorothio-N-ethylamino)-4-isopropylamino-6-chloro-1,3,5-triazine,
2-(N-chlorothio-N-isopropylamino)-4-ethylamino-6-chloro-1,3,5-triazine,
2-(N-chlorothio-N-isopropylamino)-4-isopropylamino-6-chloro-1,3,5-triazine,
2-(N-chlorothio-N-isopropylamino)-4-ethylamino-6-methylthio-1,3,5-triazine,
2-(N-chlorothio-N-ethylamino)-4-isopropylamino-6-methylthio-1,3,5-triazine,
2-(N-chlorothio-N-t-butylamino)-4-ethylamino-6-methylthio-1,3,5-triazine,
2-(N-chlorothio-N-methylamino)-4-methylamino-6-methylthio-1,3,5-triazine,
2-(N-chlorothio-N-ethylamino)-4-ethylamino-6-ethylthio-1,3,5-triazine,
2-(N-chlorothio-N-methylamino)-4-propylamino-6-pisopropylthio-1,3,5-triazine,
2-(N-chlorothio-N-isopropylamino)-4-ethylamino-6-n-butylthio-1,3,5-triazine,
2-(N-chlorothio-N-isopropylamino)-4-ethylamino-6-methoxy-1,3,5-triazine,
2-(N-chlorothio-N-ethylamino)-4-isopropylamino-6-methoxy-1,3,5-triazine,
2-(N-chlorothio-N-isopropylamino)-4-isopropylamino-6-methoxy-1,3,5-triazine,
2-(N-chlorothio-N-t-butylamino)-4-methylamino-6-ethoxy-1,3,5-triazine,
2-(N-chlorothio-N-methylaminol-4-methylamino-6-isopropoxy-1,3,5-triazine,
2-(N-chlorothio-N-methylamino)-4-dimethylamino-6-chloro-1,3,5-triazine,
2-(N-chlorothio-N-methylamino)-4-diethylamino-6-methylthio-1,3,5-triazine, and
2-(N-chlorothio-N-methylamino)-4-methylethylamino-6-methoxy-1,3,5-triazine.

The N-chlorothioamino triazines are prepared in accordance with the following reaction (1):

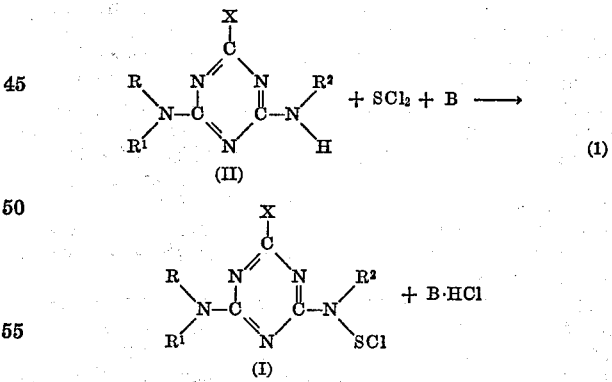

wherein R, $R^1$, $R^2$ and X have the same significance as previously defined and B is an acid acceptor.

When the triazine reactant (II) has R as hydrogen and $R^1$ and $R^2$ as different groups, a mixture of N-chlorothioamino triazines is generally obtained.

The acid acceptor is an organic base such as pyridine compound or a trialkylamine compound. Suitable pyridine compounds are pyridine and pyridine compounds of 6 to 10 carbon atoms and of 1 to 2 alkyl groups such as 2-methylpyridine, 2-ethylpyridine, 3-methylpyridine, 3,5-dimethylpyridine, and 2-butylpyridine. Suitable trialkylamines are those wherein the alkyl group contains individually 1 to 4 carbon atoms, such as trimethylamine, triethylamine, tripropylamine and tributylamine.

The sulfur dichloride and the triazine compound are employed in substantially equimolar amounts, e.g., the molar ratio of sulfur dichloride to the triazine compound generally varies from about 1.5:1 to 1:1.5, although molar ratios of sulfur dichloride to the triazine compound of 1.4:1 to 1.1:1 are preferred. The molar ratios of acid acceptor to sulfur dichloride is also substantially equimolar, e.g., the molar ratio of acid acceptor to sulfur dichloride varies from about 1.2:1 to 1:1.2, although molar ratios of acid acceptor to sulfur dichloride of 1:1 to 1:1.2 are preferred.

In order to produce the N-chlorothioamino triazine compounds of the invention in high yield, it is essential to react the triazine and sulfur dichloride in the presence of a limited amount of free, uncomplexed (unreacted) acid acceptor. This is suitably accomplished by the addition of the acid acceptor to a substantially equimolar mixture of the triazine reactant and the sulfur dichloride so that the moles of free acid acceptor to the total moles of triazine reactant and N-chlorothio triazine product is less than 0.2:1, preferably less than 0.1:1 and more preferably less than 0.05:1. In other words, during the course of the reaction between the sulfur dichloride and the triazine reactants, there should be at least 5 moles of the triazine reactant and the N-chlorothioamino triazine product per mole of acid acceptor which is not complexed with hydrochloric acid. Provided that the reaction is conducted with the restricted amount of acid acceptor indicated above, the contacting of the acid acceptor with the mixture of the triazine and the sulfur dichloride can be conducted by a variety of procedures. In one modification, the acid acceptor is added in increments, e.g., dropwise, in an inert diluent, if desired, to a mixture of the triazine and sulfur dichloride in an inert diluent. In another modification, the acid acceptor is added continuously to a mixture of the triazine and sulfur dichloride in an inert diluent.

Suitable inert diluents for the reaction include alkanes of 5 to 10 carbon atoms, such as hexane, isooctane and decane; aromatic compounds such as benzene and chlorobenzene; oxygenated hydrocarbons such as acyclic alkyl ethers, e.g., dimethoxyethane and dibutyl ether; and cycloalkyl ethers, e.g., dioxane, tetrahydrofuran and tetrahydropyran. Other suitable diluents include nitriles such as acetonitrile and propionitrile; dialkylamides such as dimethylformamide, and dialkylsulfoxides such as dimethylsulfoxide. Preferred diluents are chlorinated hydrocarbons of 1 to 2 carbon atoms, such as methylene dichloride, chloroform, carbon tetrachloride and ethylene dichloride. Generally, the amount of diluent employed ranges from 1 to 50 moles per mole of sulfur dichloride.

The reaction is suitably conducted at a temperature between −20° C. and the boiling point of the diluent, although temperatures between 0° C. and 50° C. are preferred. The reaction is conducted at or above atmospheric pressure.

In addition to the amino-S-triazine reactants represented by Formula II, the process of the invention is broadly applicable for the preparation of N-chlorothioamino derivatives of any triazine compound containing an amino substituent having at least one amino hydrogen group, i.e., a N—H group.

UTILITY

The N-chlorothioamino triazines of the invention are useful intermediates for the preparation of pesticides. For example, the N-chlorothioamino triazines can be reacted with alcohols, mercaptans, ureas, carbamates, amides, anilides, and other compounds having active hydrogen atoms to give the corresponding substitution product (and hydrochloric acid) by the more or less conventional procedures employed for the reaction of sulfenyl halides and compounds having active hydrogen atoms, as disclosed, for example, by E. Kuhle, Synthesis, 617 (1971), The preparation of N-chlorothioamino triazines of the invention and their conversion into useful herbicides are further illustrated by the following examples.

EXAMPLE 1

Preparation of 2-(N-chlorothio-N-ethylamino)-4-ethylamino-6-chloro-1,3,5-triazine 2,4-bis-(ethylamino)-6-chloro-S-triazine 10.08 g. (0.05 mole) was slurried in methylene chloride. Sulfur dichloride, 5.67 g. (0.055 mole) was then added to the slurry at room temperature. Pyridine 4.74 g. (0.06 mole) was then added dropwise over a period of 10 minutes to the slurry at a temperature between 25–30° C. The reaction mixture was stirred for 30 minutes at room temperature and filtered to remove the pyridine hydrochloric product. The filtrate solution which contained the 2-(N-chlorothio-N-ethylamino)-4-ethylamino-6-chloro-1,3,5-triazine product was analyzed by nuclear magnetic spectroscopy. The methylene hydrogens of the N-chlorothio-N-ethylamino group appeared as a quartet at 3.95 δ (relative to tetramethylsilane).

EXAMPLE 2

Preparation of 2-(N-phenyldithio-N-ethylamino)-4-ethylamino-6-chloro-1,3,5-triazine A solution of about 0.05 mole of 2-(N-chlorothio-N-ethylamino)-4-ethylamino-6-chloro-1,3,5-triazine in methylene dichloride was prepared as described in Example 1. Benzenethiol 4.95 g. (0.045 mole) and pyridine 3.95 g. (0.05 mole) dissolved in 10 ml. of methylene dichloride were then added dropwise to the solution of the N-chlorothioamino triazine at 0° C. over a period of 5 minutes. Ten minutes after the addition was complete, the reaction was washed with water, washed with sodium bicarbonate solution, dried over magnesium sulfate, and evaporated under reduced pressure to yield a brown semisolid. Chromatography over silica gel (chloroform eluent) gave the triazine product as an off-white solid, M.P. 110–111° C. Elemental analysis showed:

Calc. (percent): S, 18.7; Cl, 10.4. Found (percent): S, 18.1; Cl, 11.1.

EXAMPLE 3

Preparation of 2-(N-methyldithio-N-ethylamino)-4-ethylamino-6-chloro-1,3,5-triazine 2,4-bis-(ethylamino)-6-chloro-S-triazine 10.08 g. (0.05 mole) was slurried in methylene chloride. Sulfur dichloride, 5.67 g. (0.055 mole) was then added to the slurry at room temperature. Pyridine, 4.74 g. (0.06 mole) was then added dropwise over a period of 10 minutes at a temperature of between 25–30° C. The reaction mixture was stirred for 30 minutes at room temperature and filtered to remove the pyridine hydrochloride.

Methyl mercaptan, 2.16 g. (0.045 mole) and pyridine 3.95 g. (0.05 mole) dissolved in 10 ml. of methylene chloride was then added dropwise to the filtrate solution of the N-chlorothioamino triazine at 0° C. over a period of 5 minutes. Ten minutes after the addition was complete, the reaction was washed with water, washed with sodium bicarbonate solution, dried over magnesium sulfate, and evaporated under reduced pressure to yield a brown semi-solid. Chromatography over silica gel (benzene eluent) yielded the triazine product as a white solid, M.P. 100–102° C. Elemental analysis showed:

Calc. (percent): S, 22.9; Cl, 12.7. Found (percent): S, 22.9; Cl, 13.0.

EXAMPLE 4

Preparation of 2-(N-methoxythio-N-ethylamino)-4-ethylamino-6-chloro-1,3,5-triazine A solution of about 0.05 mole of 2-(N-chlorothio-N-ethylamino)-4-ethylamino-6-chloro-1,3,5-triazine in methylene dichloride was prepared as described in Example 1. Methanol, 1.6 g. (0.05 mole) and pyridine, 3.95 g. (0.03 mole) dissolved in 10 ml. of methylene chloride was added dropwise to the solution of the N-chlorothioamino triazine over a period of 5 minutes. Ten minutes after the addition was complete, the reaction mixture was washed with water, washed with sodium bicarbonate solution, dried over magnesium sulfate, and evaporated under reduced pressure to yield a brown oil. Chromatography over silica gel (benzene and 5% ethyl ether/95% benzene eluents) yielded the 2-(N-methoxythio-ethylamino)-4-ethylamino-6-chloro-1,3,5-triazine product, as a white solid, M.P. 95–97.5. Elemental analysis showed:

Calc. (percent): S, 12.2; Cl, 13.5. Found (percent): S, 12.2; Cl, 13.3.

EXAMPLE 5

Herbicidal tests

Pre- and post-emergence herbicidal tests on the triazines prepared in Examples 2–4 were made using the following methods:

Pre-emergence test.—An acetone solution of the test triazine was prepared by mixing 750 mg. triazine, 220 mg. of a nonionic surfactant and 25 ml. of acetone. This solution was added to approximately 125 ml. of water containing 156 mg. of surfactant.

Seeds of the test vegetation were planted in a pot of soil and the triazine solution was sprayed uniformly onto the soil surface at a dose of 100 micrograms per cm.$^2$. The pot was watered and placed in a greenhouse. The pat was watered intermittently and was observed for seedling emergence, health of emerging seedlings, etc. for a 3-week period. At the end of this period the herbicidal effectiveness of the triazine was rated based on the physiological observations. A 0 to 100 scale was used; 0 representing no phytotoxicity, 100 representing complete kill.

Post-emergence test.—The test triazine was formulated in the same manner as described above for the pre-emergence test. The concentration of the triazine in this formulation was 5,000 p.p.m. This formulation was uniformly sprayed on 2 replicate pots of 24-day-old plants (approximately 15 to 25 plants per pot) at a dose of 100 micrograms per cm.$^2$. After the plants had dried, they were placed in a greenhouse and then watered intermittently, at their bases as needed. The plants were observed periodically for phytotoxic effects and physiological and morphological responses to the treatment. After 3 weeks the herbicidal effectiveness of the triazine was rated based on these observations. A 0 to 100 scale was used; 0 representing no phytotoxicity, 100 representing complete kill.

The results of these tests appear in Table I.

I claim:
1. A compound of the formula

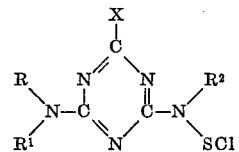

wherein X is fluorine, chlorine, bromine, alkoxy of 1 to 4 carbon atoms, or alkylthio of 1 to 4 carbon atoms; $R^1$ and $R^2$ individually are alkyl of 1 to 4 carbon atoms, and R is hydrogen or $R^1$.

2. Compound of claim 1 wherein X is chlorine, methoxy or methylthio.
3. Compound of claim 1 wherein R is hydrogen.
4. Compound of claim 1 wherein $R^1$ and $R^2$ are ethyl or isopropyl.
5. Compound of claim 1 wherein X is chlorine, R is hydrogen, and $R^1$ and $R^2$ are ethyl.
6. Process of producing N-chlorothioamino S-triazine which comprises reacting substantially equimolar amounts of a triazine represented by the formula

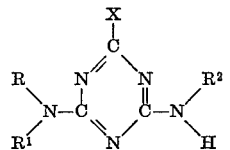

wherein X is fluorine, chlorine, bromine, alkoxy of 1 to 4 carbon atoms or alkylthio of 1 to 4 carbon atoms; $R^1$ and $R^2$ individually are alkyl of 1 to 4 carbon atoms and R is hydrogen or $R^1$, and sulfur dichloride in the presence of an acid acceptor selected from a pyridine compound or a trialkylamine with the proviso that the moles of unreacted acid acceptor to the total moles of triazine reactant and N-chlorothioamino triazine product is maintained during reaction at a ratio of less than 0.2:1 by the controlled addition of the acid acceptor to a mixture of the triazine reactant and sulfur dichloride in an inert diluent.

7. The process of claim 6 wherein the ratio of unreacted acid acceptor to the total moles of triazine reactant and N-chlorothioamino triazine is less than 0.1:1.
8. The process of claim 7 wherein the acid acceptor is a pyridine compound.
9. The process of claim 8 wherein the temperature is between 0° C. and 50° C.

TABLE I

| Compound | Herbicidal effectiveness, pre/post | | | | | |
| --- | --- | --- | --- | --- | --- | --- |
| | O | W | C | M | P | L |
| 2-(N-phenyldithio-N-ethylamino)-4-ethylamino-6-chloro-1,3,5-triazine | 100/100 | 70/100 | 100/80 | 100/100 | 100/100 | 100/100 |
| 2-(N-methyldithio-N-methylamino)-4-ethylamino-6-chloro-1,3,5-triazine | 100/100 | 100/100 | 100/100 | 100/100 | 100/100 | 100/100 |
| -(N-methoxythio-N-ethylamino)-4-ethylamino-6-chloro-1,3,5-triazine | 100/100 | 100/100 | 100/50 | 100/100 | 100/100 | 100/100 |

NOTE.—O=Wild oats (*Avena fatua*); W=Watergrass (*Echinochloa crusgalli*); C=Crabgrass (*Digitaria sanguinalis*); M=Mustard (*Brassica arvensis*); P=Pigweed (*Amaranthus retroflexus*); L=Lambsquarter (*Chenopodium album*).

References Cited
UNITED STATES PATENTS 2,907,763  10/1959  Hosler _____ 260—249.8
3,138,445   6/1964  Huemer _____ 260—249.8 X
3,141,885   7/1964  Ross et al. _____ 260—249.8

JOHN M. FORD, Primary Examiner

U.S. Cl. X.R.

424—249